United States Patent
Naghshin et al.

(10) Patent No.: US 9,892,380 B2
(45) Date of Patent: Feb. 13, 2018

(54) ADAPTIVE KNOWLEDGE NAVIGATOR

(71) Applicant: ORACLE INTERNATIONAL CORPORATION, Redwood Shores, CA (US)

(72) Inventors: Rozita Naghshin, Verdun (CA); Thierry Bonfante, Montreal (CA); Jeremy Ashley, San Francisco, CA (US); Reza Etemadi, Montreal (CA); Sherry Mead, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1157 days.

(21) Appl. No.: 13/904,261

(22) Filed: May 29, 2013

(65) Prior Publication Data

US 2014/0095396 A1    Apr. 3, 2014

Related U.S. Application Data

(60) Provisional application No. 61/707,224, filed on Sep. 28, 2012.

(51) Int. Cl.
  *G06Q 10/00*    (2012.01)
  *G06Q 10/10*    (2012.01)
(52) U.S. Cl.
  CPC .................. *G06Q 10/103* (2013.01)
(58) Field of Classification Search
  CPC ....... G06Q 10/06; G06Q 10/10; G06Q 10/067
  See application file for complete search history.

(56) References Cited

U.S. PATENT DOCUMENTS

| | | | |
|---|---|---|---|
| 8,280,755 B2 | 10/2012 | Stuhec et al. | |
| 8,458,596 B1 | 6/2013 | Malks | |
| 2008/0294723 A1 | 11/2008 | Daniels et al. | |
| 2009/0138792 A1 | 5/2009 | Cudich et al. | |
| 2009/0265634 A1* | 10/2009 | Beringer ............... | G06Q 10/10 715/733 |
| 2010/0058201 A1 | 3/2010 | Harvey et al. | |
| 2010/0082387 A1* | 4/2010 | Cao ................... | G06Q 10/0639 705/7.38 |

(Continued)

OTHER PUBLICATIONS

U.S. Appl. No. 13/326,580, Non-Final Office Action dated Dec. 22, 2015, all pages.

(Continued)

*Primary Examiner* — Maria C Santos-Diaz
(74) *Attorney, Agent, or Firm* — Kilpatrick Townsend and Stockton LLP

(57) ABSTRACT

Embodiments of the present invention are directed to providing a user interface including a dynamic visualization of an entire current context of a user, which facilitates understanding and communicating the business knowledge in collaborative business processes. According to embodiments of the present invention, these visualizations can be context sensitive and dynamically adapted to the business process metadata, user's roles, user's location, and the applicable tasks. Embodiments of the present invention provide visualizations of the evolution of the entire context including digital information and the relationships between changed items. These visualizations can include but are not limited to a 360 view, a network/dependency view, and a time-based view.

19 Claims, 10 Drawing Sheets

(56) References Cited

U.S. PATENT DOCUMENTS

2013/0085961 A1    4/2013    Naghshin et al.

OTHER PUBLICATIONS

Final Office Action dated Jan. 27, 2015 for U.S. Appl. No. 13/326,580, 34 pages.
U.S. Appl. No. 13/326,580, Non-Final Office Action dated Jul. 23, 2014, 20 pages.
U.S. Appl. No. 13/326,580, Non-Final Office Action dated Jun. 12, 2017, 34 pages.
U.S. Appl. No. 13/326,580, Final Office Action dated Jun. 13, 2016, 34 pages.

* cited by examiner

ADAPTIVE KNOWLEDGE NAVIGATOR

CROSS-REFERENCES TO RELATED APPLICATIONS

The present application claims benefit under 35 USC 119(e) of U.S. Provisional Application No. 61/707,224, filed on Sep. 28, 2012 by Naghshin et al and entitled "Adaptive Knowledge Navigator," of which the entire disclosure is incorporated herein by reference for all purposes.

This application is also related to U.S. patent application Ser. No. 13/326,580, filed on Dec. 15, 2011 by Naghshin et al and entitled "Enterprise Context Visualization" which claims benefit under 35 USC 119(e) of U.S. Provisional Application No. 61/540,684, filed on Sep. 29, 2011 by Naghshin et al and entitled "Enterprise Context Visualization," of which the entire disclosure of each is incorporated herein by reference for all purposes.

BACKGROUND OF THE INVENTION

Embodiments of the present invention relate generally to methods and systems for organizing and presenting information related to ongoing business processes and more particularly to providing an adaptive contextual visualization of business processes and related business data.

The success of any complex business process highly depends on having a clear mental model of the associated knowledge and communicate it among team members. One of the biggest challenges that current data-driven enterprises are facing is to provide enterprise users with an effective and understandable digital environment to view and navigate through large amount of data in order to have an accurate interpretation of the knowledge.

Even though the new search and semantic technologies have made the digital information more accessible, they don't provide the holistic view of the context. Items in the search result are presented discretely without visualizing their relationship to the business context, which makes complex business knowledge incomprehensible.

Business analytics and data visualisation are great means to make the data more understandable; however, they only visualize part of the knowledge which is the result of pre-defined analysis on structured data whereas business knowledge consist of structured and unstructured data with evolving relationships. Business collaborators consume huge amount of time to understand and communicate the knowledge, and strategic decisions are made based on incomplete or incorrect information. Hence, there is a need for improved methods and systems for organizing and presenting information related to ongoing business processes.

BRIEF SUMMARY OF THE INVENTION

Embodiments of the present invention relate generally to methods and systems for organizing and presenting information related to ongoing business processes and more particularly to providing an adaptive contextual visualization of business processes and related business data that also provides for intuitive navigation enterprise knowledge. According to one embodiment, providing an adaptive contextual visualization of business processes and related data can comprise receiving a selection of an object within a business process or related data. A visualization type can be selected from a plurality of different visualization types for presenting the selected object based on the selected object and a context of the selection. Selecting a visualization type based on the selected object can be further based on metadata of the selected object. Additionally or alternatively, the context of the selection can be based at least in part on one or more of a role of a user making the selection, the business process of the selected object, a task being performed by the user making the selection, or a location of the user making the selection. A knowledge board representing the business process can be generated based on the selected visualization type, wherein the knowledge board comprises a collaborative, interactive environment accessible to one or more users and wherein the knowledge board provides access to business data of the business process to the one or more users. One or more visual objects representing the selected object and the business data of the business process can be generated and added to the knowledge board based on the selected visualization type. The knowledge board with the added one or more visual objects can be provided to the one or more users.

For example, the selected visualization type can comprise a business data navigation visualization representing the selected object and one or more relationships between the selected object and one or more other objects. In such cases, the knowledge board can provide through the business data navigation visualization access to one or more actions related to the objects and contextual social collaboration related to the objects. In another example, the selected visualization type can comprise a 360 view visualization representing the selected object and one or more one or more other objects related to the selected object in a hub and spoke visual arrangement. In such cases, the knowledge board can provide access to one or more actions related to the objects and, responsive to a user selection, the knowledge board can provide a detailed view at least one of the objects and contextual social collaboration related to the at least one of the objects. Additionally or alternatively, the selected visualization type can comprise a network visualization representing the selected object and one or more one or more other objects related to the selected object in a graph-based clustering and summarization visual arrangement adapted to the current business context. In such cases, the knowledge board can provide access to one or more actions related to the objects and, in response to a user selection, detailed views of the metadata of each of the objects. In yet another example, the selected visualization type can comprise a time-based knowledge navigation visualization representing the selected object and one or more relationships between the selected object and one or more other objects and changes related to the selected object and one or more relationships between the selected object and one or more other objects over time.

According to one embodiment, a change can be detected in the metadata of the object or the context of the selection. A determination can be made as to whether the detected change in the metadata of the object or the context of the selection affects the selection of the visualization type. In response to determining the detected change in the metadata of the object or the context of the selection affects the selection of the visualization type, a new visualization type can be based on the change in the metadata of the object or the context of the selection. A new knowledge board can be generated representing the business process based on the selected new visualization type. One or more new visual objects representing the selected object and the business data of the business process can be generated and added to the knowledge board based on the selected new visualization type. The new knowledge board with the added one or more new visual objects can be presented to the one or more users.

DETAILED DESCRIPTION OF THE INVENTION

Figure 1:
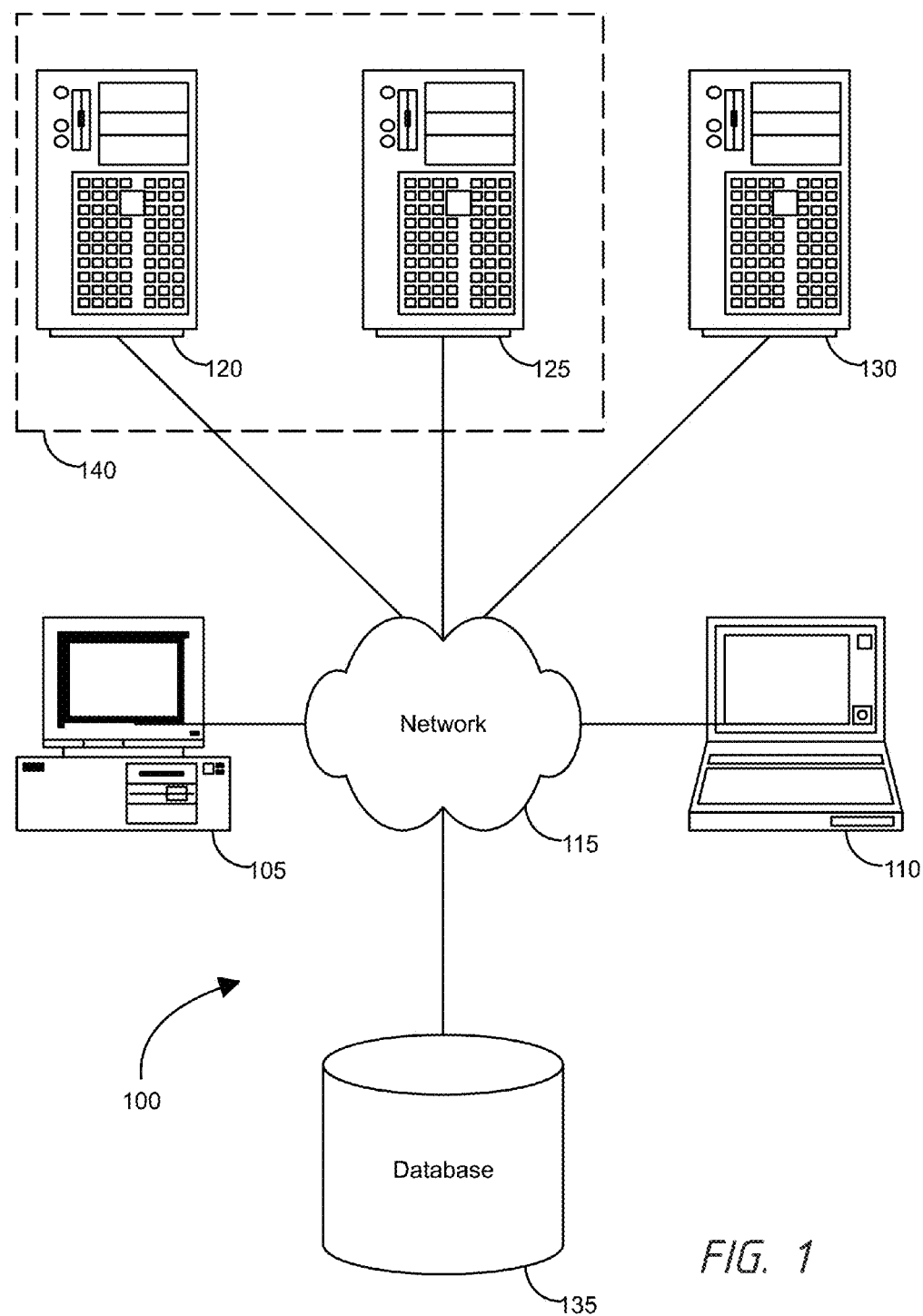
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention are directed to providing a user interface including a dynamic visualization of an entire current context of a user, which facilitates understanding and communicating the business knowledge in collaborative business processes. According to embodiments of the present invention, these visualizations can be context sensitive and dynamically adapted to the business process metadata, user's roles, user's location, and the applicable tasks. Embodiments of the present invention provide visualizations of the evolution of the entire context including digital information and the relationships between changed items. These visualizations can include a 360 view, a network/dependency view, and a time-based view as will be described below and illustrated in the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server (s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
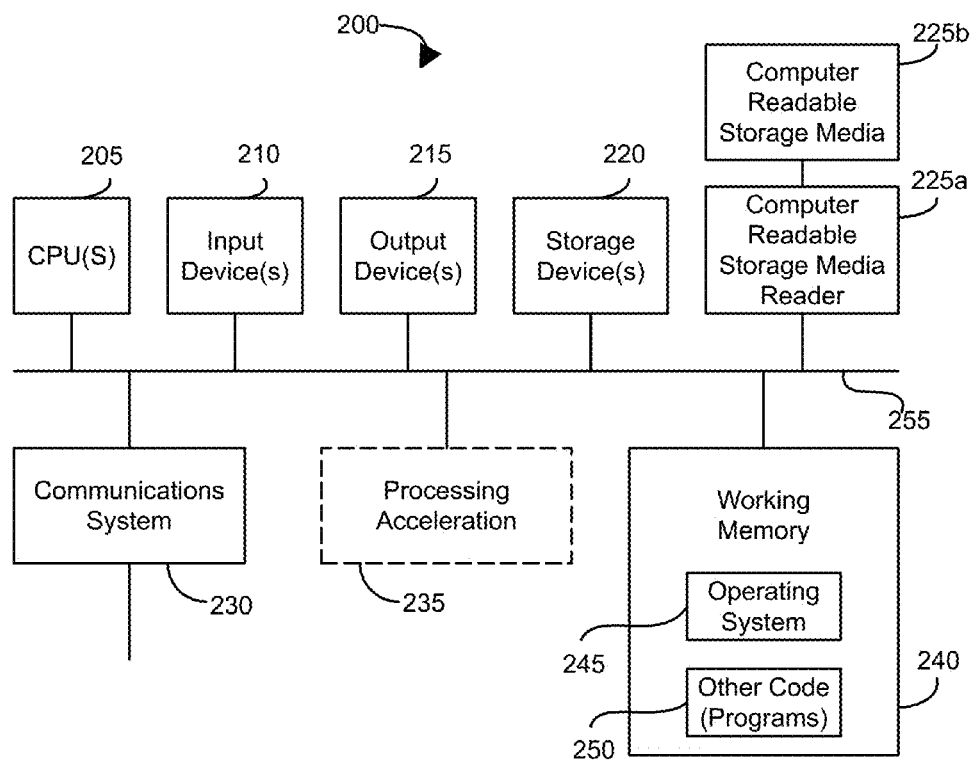
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
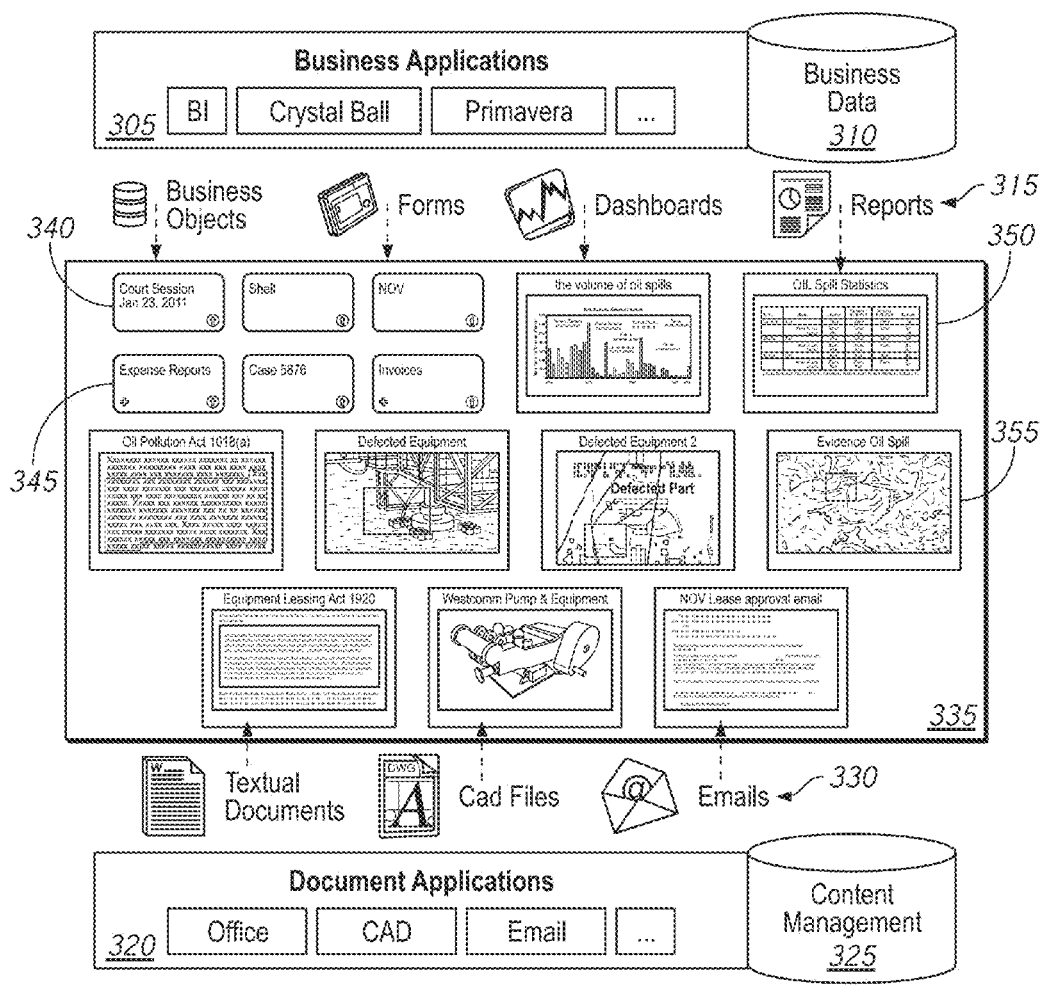
FIG. 3 is a block diagram illustrating elements of a system for providing contextual visualization according to one embodiment of the present invention.

FIG. 3 is a block diagram illustrating elements of a system for providing contextual visualization according to one embodiment of the present invention. As illustrated here, a system, such as one or more servers, clients, and/or other systems as described above, can execute one or more business application 305 and/or document applications 320. For example, the business applications 305 can include, but are not limited to, an enterprise application. The business applications 305 can execute and/or manage any number and variety of business processes such as procurement processes, project management processes, financial processes, etc. The business applications 305 can also maintain a set of business data 310 related to these various business processes. This business data 310 can include any number and variety of different types of business objects 315 such as forms, dashboards, reports, and other types of objects depending upon the business application 305 and process.

Additionally, the same or a different computer system may execute one or more document applications 320. For example, the document applications 320 can include, but are not limited to, an office application suite, a drawing or design application, an email client, etc. Each of these document applications 320 can also maintain a set of content data 325 related to these various applications. This content data 325 can include any number and variety of different types of documents 330 such as textual documents, drawings, emails, and other types of documents depending upon the application 320. These documents 330 can be generated and used by different users and/or groups of users that also participate in the business processes of the business applications 305. Thus, the documents 330 may be related to those processes and may, in different ways, be identified as such. For example, a given document may be identified as related to a business process by the contents of that document, by header information such as a title or subject line, by metadata associated with that document, etc.

As introduced above, embodiments of the invention include systems and methods for providing a contextual visualization of business processes of the business applications 305 and related business data such as the various business objects 315 and documents 330. More specifically, embodiments of the present invention provide a holistic view of digital information in the context of a business process through a set of visual objects 340, 345, 350, and 355 representing the documents 330 and business objects 315. As will be described in greater detail below, a visual object 340, 345, 350, and 355 can represent, for example, an entire document 330 or a part of a document, and it can also include annotations added by users, metadata associated with the document 330 or business object 315, etc. These visual objects 340, 345, 350, and 355 can be added to a visualization environment referred to as a visual canvas or knowledge board 335. As will also be described further below, the visual objects 340, 345, 350, and 355 can be added to the canvas or knowledge board 335 programmatically, e.g., adding all or some business objects of a particular business process, or manually by users.

As will be seen, the visual canvas or knowledge board 335 can include a master canvas or knowledge board and one or more sub-canvases. Generally speaking, a master canvas or knowledge board 335 can comprise a visual area that provides a holistic view of a context of a process of the business application 305. This visual canvas or knowledge board 335 can be automatically created for each process of a business application 305 and made available to users thereof. Sub-canvases (not shown here) can comprise visual areas of the main visual canvas or knowledge board 335 that provide holistic views of the connected business context, e.g., sub-processes, related processes, etc. These canvases can be created for any business workflow, task, internal and external collaboration, project, etc. The sub-canvases, if any, can be nested (ex. a task and sub-tasks) or can be connected (ex. Phase 1, Phase 2, etc. of a design process). The canvas or knowledge board 335 and any sub-canvases can include customized views defined by collaborators of the processes of the business application 305 and related business objects 315 and documents 330.

The visual objects 340, 345, 350, and 355 can include objects 340 and 345 representing the business objects 315 related to a process represented by the canvas or knowledge board 335. These visual objects 340 and 345 can comprise a snapshot of a related business object 315 that may be linked to the original business object 315 so that updates made to the visual object 340 or 345 in the visual canvas or knowledge board 335 can be automatically or manually, i.e., upon request, propagated and saved to the business object 315 represented. The ability of users to view and/or modify visual objects 340 and 345 and the contents of the canvas or knowledge board can be based on their access right in associated business application 305.

The visual objects 340, 345, 350, and 355 can also include objects 350 and 355 representing the documents 330 related to a process represented by the canvas or knowledge board 335. According to one embodiment, these visual objects 350 and 355 can comprise a thumbnail view of digital information created by users from the documents 330 (in whole or in part). These visual objects 350 and 355 can also include annotations and may be modified by the users. These visual object 350 and 355 can also be linked to the original documents 330 so that updates made to the visual object 350 or 355 in the visual canvas or knowledge board 335 can be automatically or manually, i.e., upon request, propagated and saved to the documents 330 represented. The ability of users to view and/or modify visual objects 350 and 355 and the contents of the canvas or knowledge board 335 can be based on their access right in associated document application 320.

Using this contextual visualization presented by the visual canvas or knowledge board 335 and the visual objects 340, 345, 350, and 355 thereon, users can update the workflow of the business process in context. Users also can add markers and tags to objects 340, 345, 350, and 355 or relationships represented in the visual canvas or knowledge board 335. According to one embodiment and depending upon the document or business object represented by the visual objects 340, 345, 350, and 355, the permissions of the user, etc. changes made to the visual objects 340, 345, 350, and 355 and/or the relationships represented in the canvas or knowledge board can be saved to the represented business objects or documents for further retrieval. That is, collaborators in or on a canvas or knowledge board 335 can comprise users of the business application with access to associated business workflow. Roles of these users within the canvas or knowledge board can be set by an administrator at canvas or knowledge board creation time. The roles and privileges of the users can be enforced both at the canvas or knowledge board and object level. The canvas or knowledge board 335 can support multi-user real time access and provide multiple users the ability to view and navigate the canvas, add to the canvas, modify objects represented thereon, etc.

Thus, embodiments of the present invention can provide a platform agnostic framework for abstracting applications used underneath. The visualizations provided hereby can connect objects and canvases from different business applications to visualize the high level business processes. For example, the user may want to connect an order management canvas or knowledge board in a Customer Relationship Management (CRM) application that contains all costumers' negotiations to an Order Fulfillment in Supply Chain Management (SCM) application that contains collaboration with suppliers to visualize an order-to-cash work flow. The visualization can also combine structured and unstructured data created by processes or users and represent relationships between those objects. The connections or relationships between objects or canvases can be of different types, e.g., directional, bidirectional, etc. These visualizations can modelize business processes and associated knowledge based on tagging, templates or user created relationships. As will be illustrated in the figures and described below, embodiments of the present invention can provide an intuitive visual interface into the state of a process and its associated knowledge based on user role, current task and access rights. These visualization can support intelligent data exploration via smart tagging and advanced search.

According to one embodiment of the present invention, a user interface, such as the canvas or knowledge board 335 described above, can be generated and provided that includes a dynamic visualization of an entire current context of a user. As will be seen, such an interface can facilitate understanding and communicating the business knowledge in collaborative business processes. According to embodiments of the present invention, these visualizations can be context sensitive and dynamically adapted to the business process metadata, user's roles, and the applicable tasks. That is, the provided visualization can be dynamically updated based on the process, the data, and/or the context. If there is a change that makes the current visualization less preferred or such that another visualization is more useful for the new circumstances, the visualization can be changed based on these conditions. Embodiments of the present invention provide visualizations of the evolution of the entire context including digital information and the relationships between changed items. These visualizations can include a 360 view, a network view, and a time-based view as will be described below and illustrated in the figures.

Figure 4:
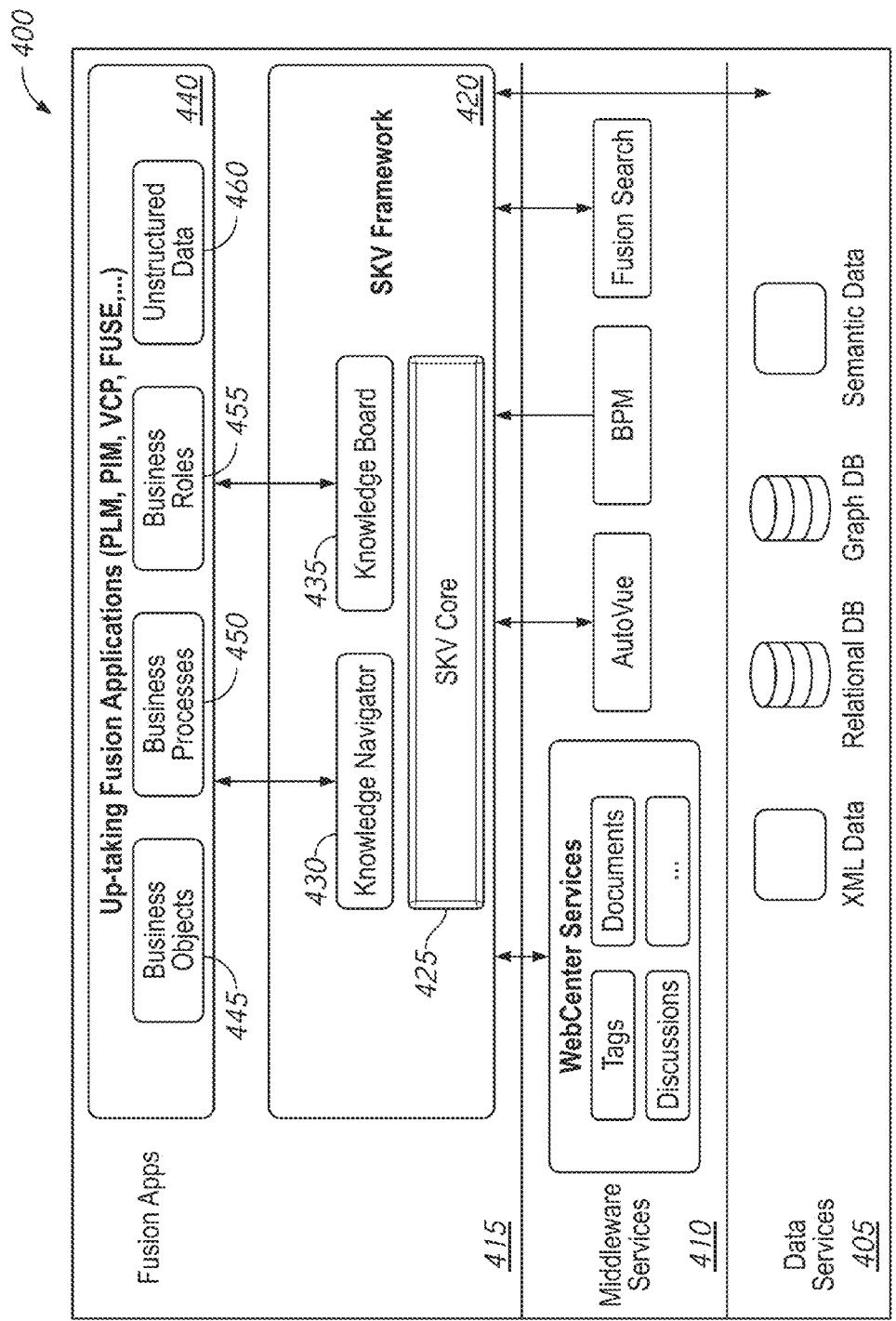
FIG. 4 is a block diagram illustrating elements of an exemplary architecture for providing adaptive contextual visualization according to one embodiment of the present invention.

FIG. 4 is a block diagram illustrating elements of an exemplary architecture for providing adaptive contextual visualization according to one embodiment of the present invention. As is illustrated in this example, the architecture 400 can be considered to consist of data services 405, middleware services 410, and applications 415. Generally speaking, the data services 405 can comprise databases and/or other repositories as known in the art for storing and retrieving data in different formats. The middleware services 410 can comprise any of a wide variety of known services for interacting with and/or controlling the data services 405 and the data stored therein. The applications 415 can include any type of application including but not limited to one or more enterprise applications 440. As is known in the art, these applications 440 can maintain and operate on any number of business objects 445, business processes 450, business roles 455, unstructured data 460, etc. Also as know, some or all of the data and/or process of these applications may, at least in part, be maintained in or interact with the data services 405 through the middleware services 410.

More specifically, the elements of this architecture 400, executing on any one or more computer systems as described above can provide an adaptive knowledge navigator 430 executing in a Semantic Knowledge Visualization (SKV) framework 420. The SKV framework can comprise an SKV core 425, the knowledge navigator 430, and knowledge board 435. The SKV core 425 can comprise an application controlling or managing the knowledge navigator 430 and knowledge board 435. The adaptive knowledge navigator 430 can provide users with intuitive paradigm to explore enterprise knowledge in the form of the knowledge board 435.

According to one embodiment of the present invention, the SKV framework, through the knowledge navigator 430, can provide the user with an intuitive representation of the contextual knowledge in the form of the graphical and other visual representations on the knowledge board 435. The representations presented in the knowledge board can provide the user with understandable visualization of the knowledge represented by a business objects, data, business processes, etc. for an application 440. The representation of the knowledge board 435 can include various types of data, e.g., structured, unstructured, semi structured, social, etc., and can represent the relationships among the visualized data. The knowledge navigator 430 and knowledge board 435 can also provide direct access to predefined applicable actions related to the presented data and/or processes and provide intuitive data navigation, for example, through a set of animations to help the user navigate through the information and create an accurate mental model of the knowledge.

According to one embodiment of the present invention the knowledge navigator 430 and knowledge board 435 can provide an intuitive search visualization. That is, the SKV framework 420 can be connected to one or more search engines and can receive search results therefrom. The knowledge navigator 430 and knowledge board 435 can then provide visualizations of the search results in a unique understandable way. Users can then intuitively navigate through the knowledge by drilling down to view more information, applying filters, changing the search focus, etc.

According to one embodiment of the present invention knowledge navigator 430 and knowledge board 435 can provide adaptive knowledge visualization. That is, the knowledge navigator 430 and knowledge board 435 can dynamically adapt the visualization to the business context. This business context can include but is not limited to business process metadata, a user's role, a primary task, a user's location, a used device, etc. These different visualizations can provide different views or different ways of presenting the knowledge based on the context. In some cases, the knowledge board 435 can visually highlight the business metadata that is important for a specific context. In some cases, the present invention knowledge navigator 430 and knowledge board 435 can provide visualization changes based on context sensitive data ranking. For example, embodiments of the present invention can provide the capabilities to rate the information manually by users (ex. Thumbs up/down, tags, etc.) or programmatically through a user's interaction (ex. hiding a partial data several times can down grade the data) for a specific business context. This ranking can then be available for use by a connected search engine and/or can be used to highlight the most important or highest ranked information for an specific context.

According to one embodiment of the present invention the present invention knowledge navigator 430 and knowledge board 435 can provide a time-based knowledge representation. Such embodiments can provide the ability to visualize an evolution of the business information by exposing changes related to the business objects and/or processes over time and providing a visualization of the relationships between changed items. Examples of each of these different visualization types will be described in detail below with reference to FIGS. 6-9.

Figure 5:
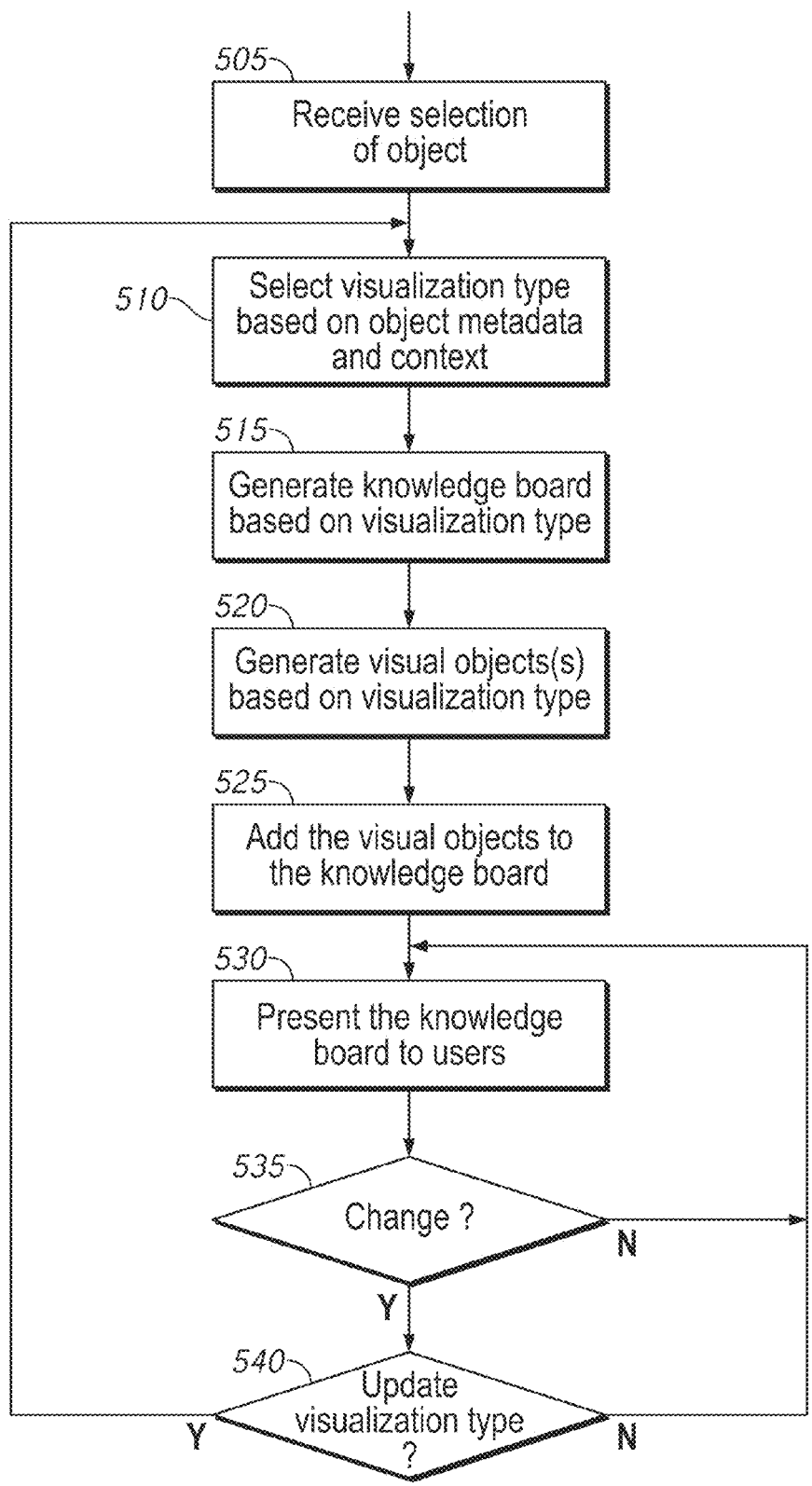
FIG. 5 is a flowchart illustrating an exemplary process for providing adaptive contextual visualization according to one embodiment of the present invention.

FIG. 5 is a flowchart illustrating an exemplary process for providing adaptive contextual visualization according to one embodiment of the present invention. As illustrated here, providing an adaptive contextual visualization of business processes and related data can comprise receiving 505 a selection of an object within a business process or related data. The selection can be received 505, for example, based on a user selecting, requesting, opening, or otherwise indicating a particular object, based on execution of an application or script, or upon the occurrence of some other event or satisfaction of some other conditions. Regardless of how the selection of an object occurs, a visualization type can be selected 510 from a plurality of different visualization types for presenting the selected object based on the selected object and a context of the selection. The visualization types can comprise a business data navigation visualization, a 360 view visualization, a network visualization, or a time-based knowledge navigation visualization. Examples of each of these different visualization types will be described in detail below with reference to FIGS. 6-9. Selecting 510 a visualization type based on the selected object can be based on metadata of the selected object. The context of the selection can be based at least in part on one or more of a role of a user making the selection, the business process of the selected object, a task being performed by the user making the selection, a location of the user making the selection, and/or any of a number of other factors related to the user, the business process, the business data, etc. That is, based on the data presented, the process to which it relates, the user and what that user may be doing, and other considerations can be used to select a different way to visualize and present the data.

Once a visualization type has been selected 510, a knowledge board representing the business process can be generated 515 based on the selected visualization type. The knowledge board can comprise a collaborative, interactive environment accessible to one or more users and which provides access to business data of the business process to the one or more users. One or more visual objects representing the selected object and the business data of the business process can be generated 520 based on the selected visualization type. The one or more visual objects representing the selected object and the business data of the business process can be added 525 to the knowledge board based on the selected visualization type and the knowledge board with the added one or more visual objects can be provided 530 to the one or more users.

As noted above, the provided visualization can be dynamically updated based on the process, the data, and/or the context. That is, if there is a change that makes the current visualization less preferred or such that another visualization is more useful for the new circumstances, the visualization can be changed based on these conditions. Therefore and according to one embodiment, providing an adaptive contextual visualization of business processes and related data can further comprise detecting 535 a change in the metadata of the object or the context of the selection and determining 540 whether the detected change in the metadata of the object or the context of the selection affects the selection of the visualization type. In response to determining 540 the detected change in the metadata of the object or the context of the selection affects the selection of the visualization type, the visualization can be updated by again selecting 510 a new visualization type based on the change in the metadata of the object or the context of the selection, generating 515 a new knowledge board representing the business process based on the selected new visualization type, generating 520 one or more new visual objects representing the selected object and the business data of the business process based on the selected new visualization type, adding 525 the one or more new visual objects representing the selected object and the business data of the business process to the new knowledge board based on the selected new visualization type, and providing 530 the new knowledge board with the added one or more new visual objects to the one or more users.

Figure 6:
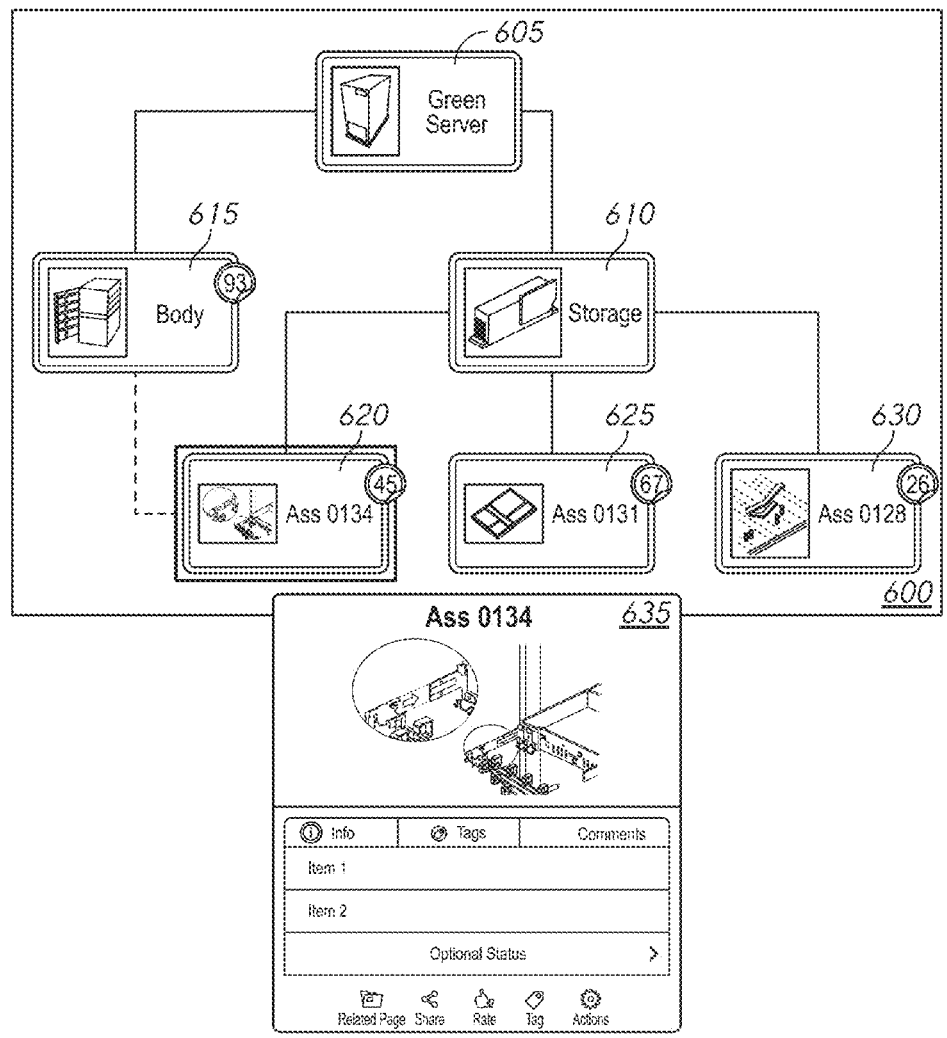
FIG. 6 is an illustration of a portion of an exemplary user interface for providing a business data navigation visualization according to one embodiment of the present invention.

FIG. 6 is an illustration of a portion of an exemplary user interface for providing a business data navigation visualization according to one embodiment of the present invention. This example illustrates a visualization including a knowledge board 600 with a number of visual objects 605-630 added which represent various business objects. The knowledge board 600 can also present a relationship visualization illustrating the relationship between the business objects represented by the visual objects 605-630. The relationships represented can be any type, e.g., hierarchical, many-to-many, directional, etc. This business object visualization, i.e., through the visual objects 605-630 presented on the knowledge board 600 can provide a metadata visualization or a view into the metadata of the represented objects and can provide a zoom and view of detailed information of the object. For example, when one of the visual objects 620 is selected, a zoom view 635 of details of the business object represented by the selected visual object 620. Through this zoom view 632 users can access the business object in a form of contextual social collaboration through which they can create or update threaded discussions, add tags (predefined tags or user tags), expose user feedback to semantic search engines for further discovery, etc. Each of the visual objects 605-630 can also connect to or provide links to one or more predefined contextual actions related to the business object represented by the visual objects. Actions taken through the visual object can be reflected into enterprise applications using the business objects represented.

In summary and stated another way, the business data navigation visualization can represent the selected object and one or more relationships between the selected object and one or more other objects. The knowledge board can provide, through the business data navigation visualization, access to one or more actions related to the objects. The business data navigation visualization can also provide contextual social collaboration related to the objects through the knowledge board.

Figure 7:
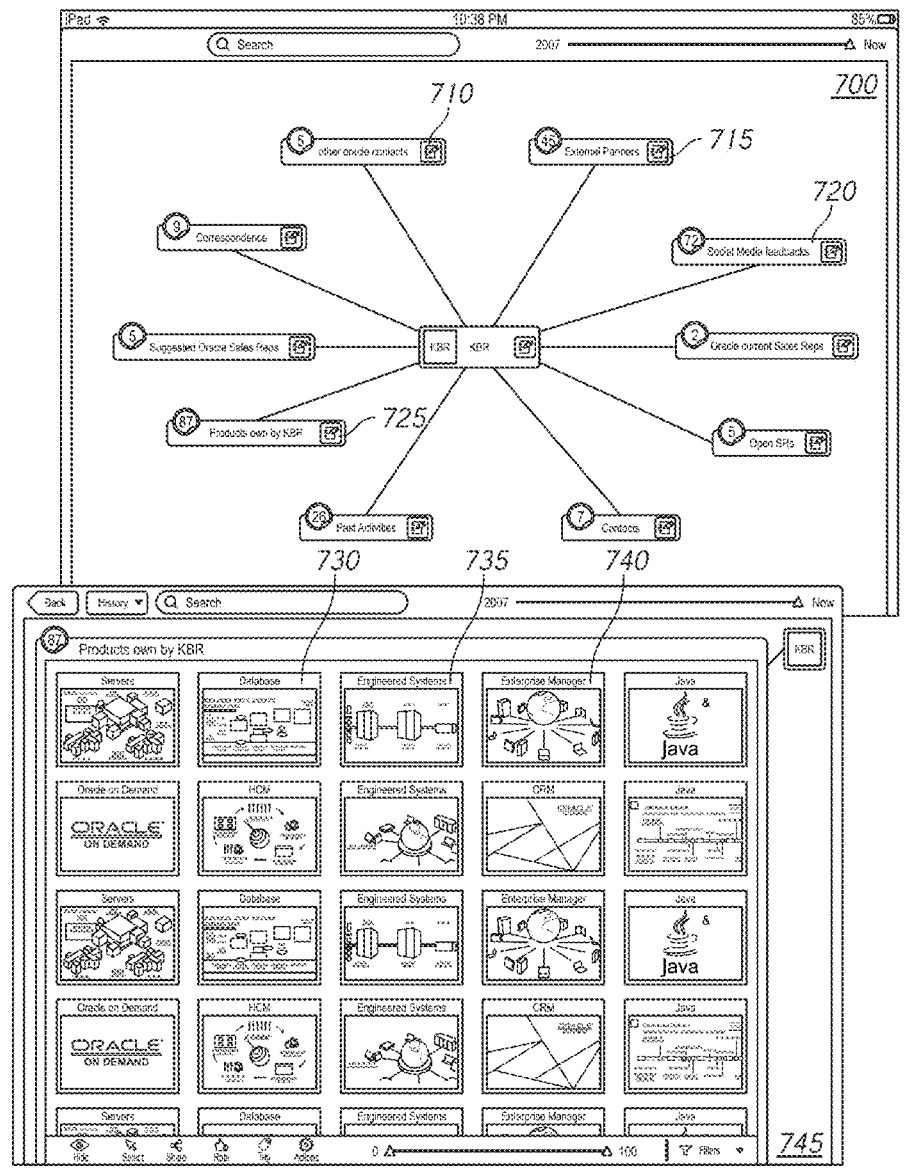
FIG. 7 is an illustration of a portion of an exemplary user interface for providing a 360 view navigation visualization according to one embodiment of the present invention.

FIG. 7 is an illustration of a portion of an exemplary user interface for providing a 360 view navigation visualization according to one embodiment of the present invention. This example illustrates a visualization including a knowledge board 700 with a number of visual objects 705-725 added which represent various business objects. This visualization can show a selected object 705 and any number of related objects 710-725 in the form of a hub and spoke type arrangement which can provide a 360 visualization of any type of data (structured, unstructured, social, etc.). In some cases, the visualization can connect to semantic search engines to leverage search filters/facets. As with the other visualization types, each of the visual objects 705-725 can also connect to or provide links to one or more predefined contextual actions related to the business object represented by the visual objects. Actions taken through the visual object can be reflected into enterprise applications using the business objects represented.

According to one embodiment, this visualization can provide an ability to change the focus of 360 view from one represented object to another. In some cases, this business object visualization, i.e., through the visual objects 705-725 presented on the knowledge board 700 can provide a visualization or a view into the details of the represented objects and can provide a zoom and view of detailed information of the object. For example, when one of the visual objects 725 is selected, a zoom view 745 of details of the business object, such as sub-objects 730-740, of the selected business object 725. Through this zoom view 745 users can access the business object 725 and/or sub-objects 730-740 in a form of contextual social collaboration through which they can create or update threaded discussions, add tags (predefined tags, user tags) provide a contextual ranking of information (user's role, business process, tasks, etc.), expose contextual feedbacks to semantic search engines for redefining search result, etc.

In summary and stated another way, the 360 view navigation visualization can represent the selected object and one or more one or more other objects related to the selected object in a hub and spoke visual arrangement. The knowledge board can provide, through the 360 view navigation visualization, access to one or more actions related to the objects. The 360 view navigation visualization can also provide detailed views of each of the presented objects and contextual social collaboration related to the objects through the knowledge board.

Figure 8:
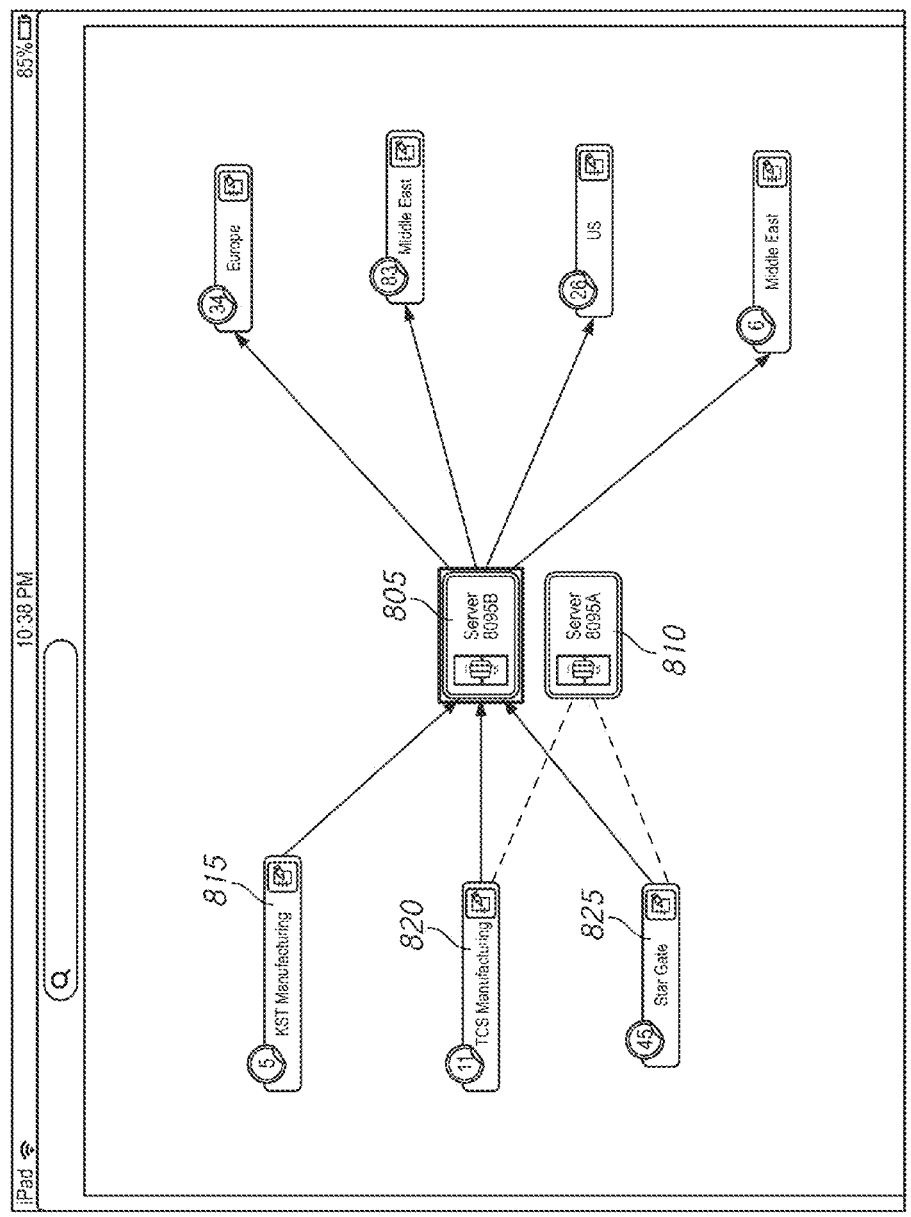
FIG. 8 is an illustration of a portion of an exemplary user interface for providing network visualization according to one embodiment of the present invention.

FIG. 8 is an illustration of a portion of an exemplary user interface for providing network visualization according to one embodiment of the present invention. This example illustrates a visualization including a knowledge board 800 with a number of visual objects 805-825 added which represent various business objects. This visualization can show a selected object 805 and any number of related objects 810-825 arranged as a coherent graph-based clustering and summarization that can be adapted to the current business context (user's role, business process, location, etc.). In this way, the knowledge board 800 can visually draw the user's attention to the most important or relevant information.

As with the other visualization types, this business object visualization, i.e., through the visual objects 805-825 presented on the knowledge board 800 can provide a metadata visualization or a view into the metadata of the represented objects. Additionally or alternatively, each of the visual objects 805-825 can also connect to or provide links to one or more predefined contextual actions related to the business object represented by the visual objects. Actions taken through the visual object can be reflected into enterprise applications using the business objects represented.

In summary and stated another way, the network visualization can represent the selected object and one or more one or more other objects related to the selected object in a graph-based clustering and summarization visual arrangement that can be adapted to the current business context. The knowledge board can provide, through the network visualization, access to one or more actions related to the objects. The network visualization can also provide detailed views of the metadata of each of the presented objects.

Figure 9:
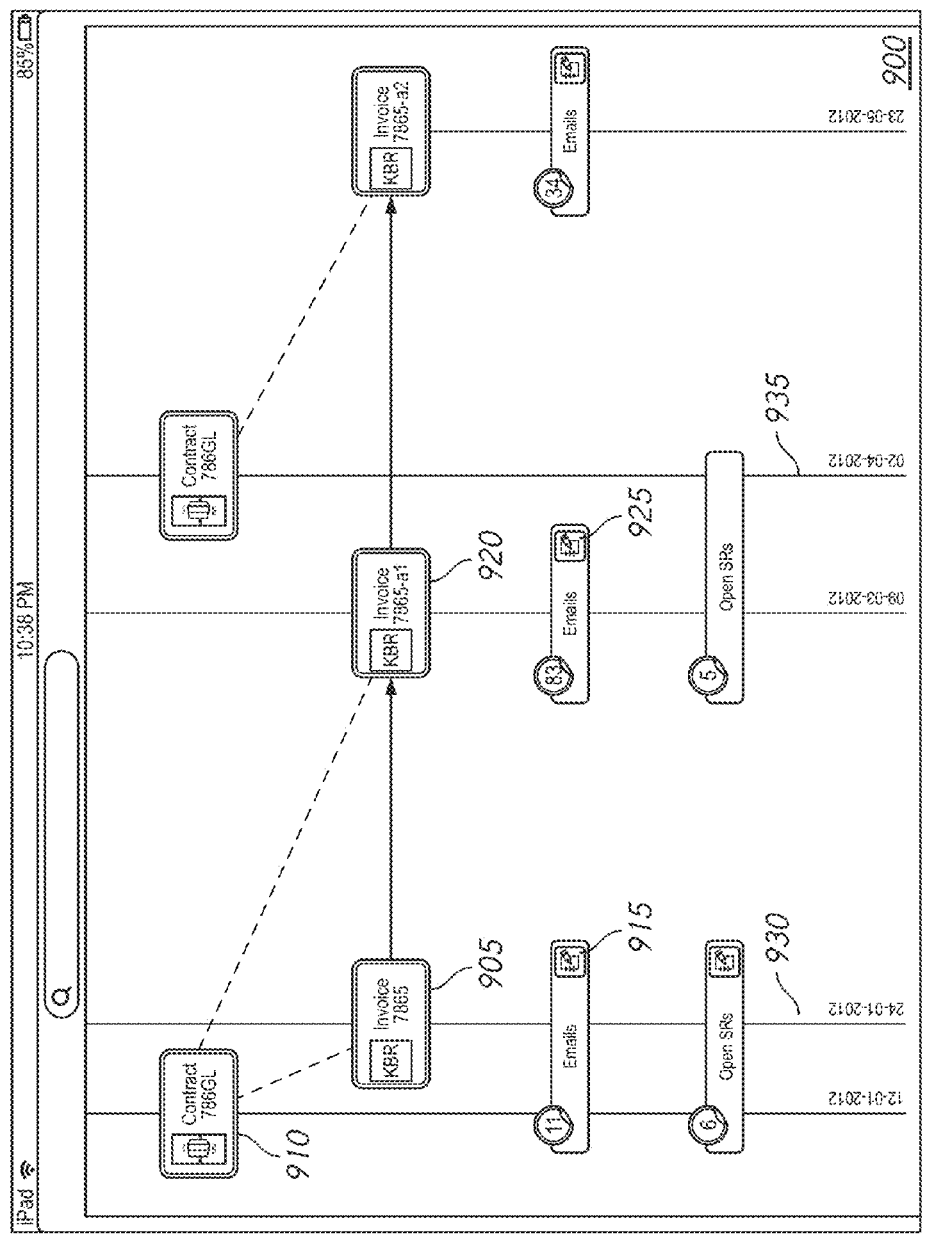
FIG. 9 is an illustration of a portion of an exemplary user interface for providing a time-based knowledge navigation visualization according to one embodiment of the present invention.

FIG. 9 is an illustration of a portion of an exemplary user interface for providing a time-based knowledge navigation visualization according to one embodiment of the present invention. Generally speaking, such an interface can provide the ability to visualize an evolution of the business information by exposing changes related to the business objects and/or processes over time and providing a visualization of the relationships between changed items. More specifically, this example illustrates a knowledge board 900 that includes a time-based relationship visualization of relationships between business objects 905-925 at different times 930 and 935. The relationships represented can be of any type, e.g., hierarchical, many-to-many, directional, dependencies, etc. In some cases, the time-based knowledge navigation visualization can provide an ability to look at multiple related entities on the same time-based plane. Each of the visual objects 905-925 can also connect to or provide links to one or more predefined contextual actions related to the business object represented by the visual objects. Actions taken through the visual object can be reflected into enterprise applications using the business objects represented.

It should be noted that the exemplary interfaces described above are offered for illustrative purposes and should not be considered limiting. Rather, numerous variations are contemplated, depending upon the exact implementation, and are also considered to be within the scope of the present invention. In some cases, these variations may include one or more animations or other effects, used together or separately. Such animations or effects can be used, for example, to give a sense of direction, e.g., changing the position of items as the user moves along a path or drills down to a specific area. In another example, animations or effects can be used to give a sense of relativity, e.g., as specific metadata changes, relative objects can be moved closer together or further apart. Additionally or alternatively, animations or effects can be used highlight revolution of information, e.g., as the user goes though time using a time slider the changed business object can by moved toward the user to grab user's attention. In yet another example, animations or effects can be used to shows connectivity between objects, e.g., selecting and focusing an item in a graph can bring connected items close to the selected item.

Figure 10:
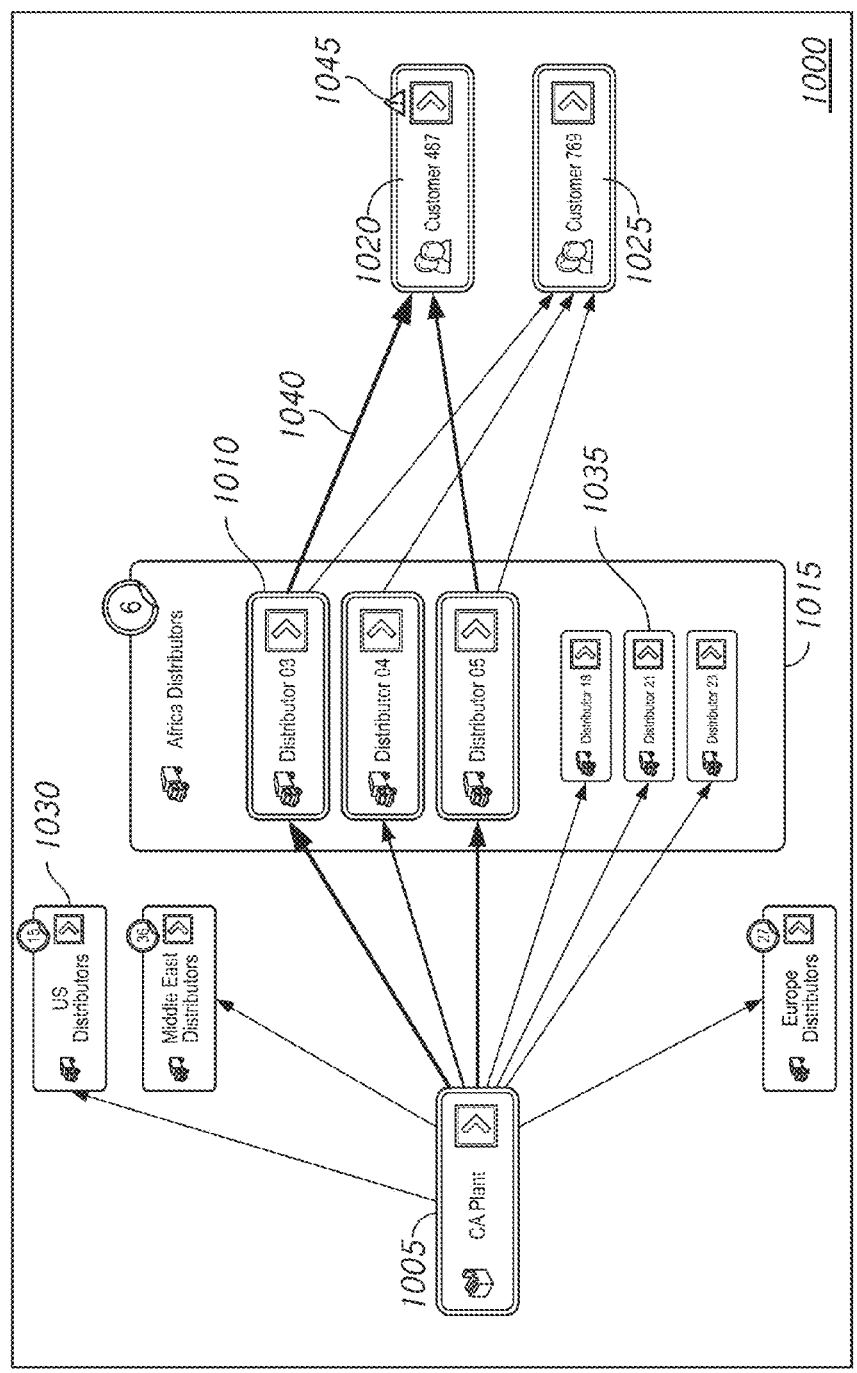
FIG. 10 is an illustration of an exemplary use of one implementation of user interface according to one embodiment of the present invention.

FIG. 10 is an illustration of an exemplary use of one implementation of user interface according to one embodiment of the present invention. More specifically, this example illustrates visualization changes based on business context. In this example, the user can be monitoring a supply chain network. His goal may be to identify bottlenecks in a large network and take necessary actions. The visualization can highlight the important information based on his role and business process and help him to achieve his task in a short amount of time.

As illustrated here, the visualization can include a number of visual objects 1005-1030 presented on a knowledge board 1000 as described above. Exemplary animations illustrated here include highlighting (e.g., represented by a colored border or other effect) around one or more visual objects 1005 representing business objects that require some attention by the user. Additionally or alternatively, one or more visual objects 1030 and 1035 representing business objects that are, in the current context, irrelevant or of less significance can be hidden, shaded, or otherwise visually subdued. In some cases, visualization properties can be changed to show a specific attribute value. For example, a thickness, color, or other property of a line 1040 can be changed to illustrate a relative flow rate between business objects represented by visual objects 1010 and 1045 presented on the knowledge board 1000. Additionally or alternatively, animations or effects can include presenting icons 1045 to highlight a specific in-context metadata or object 1020. Once again, other variations are contemplated and considered to be within the scope of the present invention.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
   receiving a selection of an object within a process, wherein the selected object contains first data related to the process, wherein the first data is viewable via a first application;
   selecting, based on the selected object and a context of the selection, a first visualization type from a plurality of different visualization types for presenting the selected object;
   based upon the first visualization type:
      generating a user interface for outputting and accessing data for the process;
      generating one or more visual objects for representing the selected object, wherein the one or more visual objects displays a portion of the first data contained in the selected object, wherein the one or more visual objects are modifiable by one or more users, and wherein a modification made to the portion of the first data displayed by the one or more visual objects is automatically propagated to the first data contained in the selected object;
   adding the one or more visual objects to the user interface according to a first visual arrangement, wherein the first visual arrangement is based on the first visualization type;
   outputting, on a display device, the user interface with the added one or more visual objects, wherein the user interface further displays information indicative of a relationship between the selected object and a second object, wherein the second object contains second data related to the process, and wherein the second data is viewable via a second application;
   detecting a change in the first data of the selected object;
   selecting, in response to detecting the change, a second visualization type from the plurality of different visualization types, wherein the second visualization type is different from the first visualization type; and
   updating the user interface, wherein the updating comprises:
      generating one or more updated visual objects for representing the selected object, wherein the one or more updated visual objects displays the change in the first data of the selected object;
      adding the one or more updated visual objects to the user interface according to a second visual arrangement, wherein the second visual arrangement is based on the second visualization type; and
   outputting, on the display device, the updated user interface with the one or more updated visual objects.

2. The method of claim 1, wherein selecting a first visualization type based on the selected object is further based on metadata of the selected object.

3. The method of claim 2, wherein the context of the selection is based at least in part on one or more of a role of a user making the selection, the process of the selected object, a task being performed by the user making the selection, or a location of the user making the selection.

4. The method of claim 3, further comprising:
   detecting a change in the metadata of the selected object or the context of the selection;
   determining whether the detected change in the metadata of the selected object or the context of the selection affects the selection of the first visualization type;
   in response to determining the detected change in the metadata of the selected object or the context of the selection affects the selection of the first visualization type, selecting a new visualization type based on the change in the metadata of the selected object or the context of the selection, generating a new user interface representing the process based on the selected new visualization type, generating one or more new visual objects representing the selected object and data of the process based on the selected new visualization type, adding the one or more new visual objects representing the selected object and data of the process to the new user interface based on the selected new visualization type, and providing the new user interface with the added one or more new visual objects to the one or more users.

5. The method of claim 1, wherein the first visualization type comprises a data navigation visualization representing the selected object and one or more relationships between the selected object and the second object, wherein the user interface provides through the data navigation visualization access to one or more actions related to the selected object, and wherein the user interface provides through the data navigation visualization contextual social collaboration related to the selected object.

6. The method of claim 1, wherein the first visualization type comprises a 360 view visualization representing the selected object and the second object related to the selected object in a hub and spoke visual arrangement, wherein the user interface provides access to one or more actions related to the selected object, and wherein responsive to a user selection the user interface provides a detailed view of the selected object and contextual social collaboration related to the selected object through the user interface.

7. The method of claim 1, wherein the first visualization type comprises a network visualization representing the selected object and the second object related to the selected object in a graph-based clustering and summarization visual arrangement adapted to the context of the selection, wherein the user interface provides access to one or more actions related to the selected object, and wherein the user interface provides, in response to a user selection, detailed views of the metadata of the selected object.

8. The method of claim 1, wherein the first visualization type comprises a time-based knowledge navigation visualization representing the selected object and one or more relationships between the selected object and the second object and changes related to the selected object and one or more relationships between the selected object and the second object over time.

9. A system comprising:
a processor; and
a memory coupled with and readable by the processor and storing a set of instructions which, when executed by the processor, causes the processor to perform actions for:
receiving a selection of an object within a process, wherein the selected object contains first data related to the process, wherein the first data is viewable via a first application;
selecting, based on the selected object and a context of the selection, a first visualization type from a plurality of different visualization types for presenting the selected object;
based upon the first visualization type:
generating a user interface for outputting and accessing data for the process;
generating one or more visual objects for representing the selected object, wherein the one or more visual objects displays a portion of the first data contained in the selected object, wherein the one or more visual objects are modifiable by one or more users, and wherein a modification made to the portion of the first data displayed by the one or more visual objects is automatically propagated to the first data contained in the selected object;
adding the one or more visual objects to the user interface according to a first visual arrangement, wherein the first visual arrangement is based on the first visualization type;
outputting, on a display device, the user interface with the added one or more visual objects, wherein the user interface further displays information indicative of a relationship between the selected object and a second object, wherein the second object contains second data related to the process, and wherein the second data is viewable via a second application;
detecting a change in the first data of the selected object;
selecting, in response to detecting the change, a second visualization type from the plurality of different visualization types, wherein the second visualization type is different from the first visualization type; and
updating the user interface, wherein the updating comprises:
generating one or more updated visual objects for representing the selected object, wherein the one or more updated visual objects displays the change in the first data of the selected object;
adding the one or more updated visual objects to the user interface according to a second visual arrangement, wherein the second visual arrangement is based on the second visualization type; and
outputting, on the display device, the updated user interface with the one or more updated visual objects.

10. The system of claim 9, wherein selecting a first visualization type based on the selected object is further based on metadata of the selected object and wherein the context of the selection is based at least in part on one or more of a role of a user making the selection, the process of the selected object, a task being performed by the user making the selection, or a location of the user making the selection.

11. The system of claim 10, wherein the set of instructions, when executed by the processor, further causes the processor to perform actions for:
detecting a change in the metadata of the selected object or the context of the selection;
determining whether the detected change in the metadata of the selected object or the context of the selection affects the selection of the first visualization type;
in response to determining the detected change in the metadata of the selected object or the context of the selection affects the selection of the first visualization type, selecting a new visualization type based on the change in the metadata of the selected object or the context of the selection, generating a new user interface representing the process based on the selected new visualization type, generating one or more new visual objects representing the selected object and data of the process based on the selected new visualization type, adding the one or more new visual objects representing the selected object and data of the process to the new user interface based on the selected new visualization type, and providing the new user interface with the added one or more new visual objects to the one or more users.

12. The system of claim 9, wherein the first visualization type comprises a data navigation visualization representing the selected object and one or more relationships between the selected object and the second object, wherein the user interface provides through the data navigation visualization access to one or more actions related to the selected object, and wherein the user interface provides through the data navigation visualization contextual social collaboration related to the selected object.

13. The system of claim 9, wherein the first visualization type comprises a 360 view visualization representing the selected object and the second object related to the selected object in a hub and spoke visual arrangement, wherein the user interface provides access to one or more actions related to the selected object, and wherein responsive to a user selection the user interface provides a detailed view at least one of the selected object and contextual social collaboration related to the at least one of the selected object through the user interface.

14. The system of claim 9, wherein the first visualization type comprises a network visualization representing the selected object and the second object related to the selected object in a graph-based clustering and summarization visual arrangement adapted to the context of the selection, wherein the knowledge board provides access to one or more actions related to the selected object, and wherein the knowledge board provides, in response to a user selection, detailed views of the metadata of the selected object.

15. The system of claim 9, wherein the first visualization type comprises a time-based knowledge navigation visualization representing the selected object and one or more relationships between the selected object and the second object and changes related to the selected object and one or more relationships between the selected object and the second object.

16. A computer-readable memory comprising a set of instructions stored therein which, when executed by a processor, causes the processor to perform actions for:
> receiving a selection of an object within a process, wherein the selected object contains first data related to the process, wherein the first data is viewable via a first application;
> selecting, based on the selected object and a context of the selection, a first visualization type from a plurality of different visualization types for presenting the selected object;
> based upon the first visualization type:
> > generating a user interface for outputting and accessing data for the process;
> > generating one or more visual objects for representing the selected object, wherein the one or more visual objects displays a portion of the first data in the selected object, wherein the one or more visual objects are modifiable by one or more users, and wherein a modification made to the portion of the first data displayed by the one or more visual objects is automatically propagated to the first data contained in the selected object;
>
> adding the one or more visual objects to the user interface according to a first visual arrangement, wherein the first visual arrangement is based on the first visualization type;
> outputting, on a display device, the user interface with the added one or more visual objects, wherein the user interface further displays information indicative of a relationship between the selected object and a second object, wherein the second object contains second data related to the process, and wherein the second data is viewable via a second application;
> detecting a change in the first data of the selected object;
> selecting, in response to detecting the change, a second visualization type from the plurality of different visualization types, wherein the second visualization type is different from the first visualization type;
> updating the user interface, wherein the updating comprises:
> > generating one or more updated visual objects for representing the selected object, wherein the one or more updated visual objects displays the change in the first data of the selected object;
>
> adding the one or more updated visual objects to the user interface according to a second visual arrangement, wherein the second visual arrangement is based on the second visualization type; and
> outputting, on the display device, the updated user interface with the one or more updated visual objects.

17. The computer-readable memory of claim 16, wherein selecting a first visualization type based on the selected object is further based on metadata of the selected object.

18. The computer-readable memory of claim 17, wherein the context of the selection is based at least in part on one or more of a role of a user making the selection, the process of the selected object, a task being performed by the user making the selection, or a location of the user making the selection.

19. The computer-readable memory of claim 18, wherein the set of instructions, when executed by a processor, further causes the processor to perform actions for:
> detecting a change in the metadata of the selected object or the context of the selection;
> determining whether the detected change in the metadata of the selected object or the context of the selection affects the selection of the first visualization type;
> in response to determining the detected change in the metadata of the selected object or the context of the selection affects the selection of the first visualization type, selecting a new visualization type based on the change in the metadata of the selected object or the context of the selection, generating a new user interface representing the process based on the selected new visualization type, generating one or more new visual objects representing the selected object and data of the process based on the selected new visualization type, adding the one or more new visual objects representing the selected object and data of the process to the new user interface based on the selected new visualization type, and providing the new user interface with the added one or more new visual objects to the one or more users.

* * * * *

UNITED STATES PATENT AND TRADEMARK OFFICE
CERTIFICATE OF CORRECTION

PATENT NO. : 9,892,380 B2
APPLICATION NO. : 13/904261
DATED : February 13, 2018
INVENTOR(S) : Naghshin et al.

Page 1 of 1

It is certified that error appears in the above-identified patent and that said Letters Patent is hereby corrected as shown below:

In the Specification

In Column 14, Line 38, delete "by" and insert -- be --, therefor.

Signed and Sealed this
Eighteenth Day of September, 2018

Andrei Iancu
*Director of the United States Patent and Trademark Office*